United States Patent
Ikeda et al.

(10) Patent No.: US 6,468,670 B1
(45) Date of Patent: Oct. 22, 2002

(54) MAGNETIC RECORDING DISK WITH COMPOSITE PERPENDICULAR RECORDING LAYER

(75) Inventors: Yoshihiro Ikeda, San Jose, CA (US); Manfred Ernst Schabes, San Jose, CA (US); Yoshiaki Sonobe, San Jose, CA (US); Kentaro Takano, San Jose, CA (US); Dieter Klaus Weller, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/487,234

(22) Filed: Jan. 19, 2000

(51) Int. Cl.$^7$ .................................................. G11B 5/66
(52) U.S. Cl. ...................... 428/611; 428/65.3; 428/65.7; 428/669; 428/670; 428/694 TM; 428/694 TS
(58) Field of Search .................................. 428/611, 663, 428/669, 680, 681, 900, 694 TS, 694 TM, 670, 65.3, 65.7

(56) References Cited

U.S. PATENT DOCUMENTS

| | | | |
|---|---|---|---|
| 5,723,978 A | * 3/1998 | Inomata et al. | 324/235 |
| 5,750,270 A | * 5/1998 | Tang et al. | 428/611 |
| 6,071,607 A | * 6/2000 | Okuyama et al. | 428/332 |
| 6,183,893 B1 | * 2/2001 | Futamoto et al. | 428/694 TS |

OTHER PUBLICATIONS

P. F. Carcia, et al., "Perpendicular Magnetic Anisotropy in Pd/Co Thin Film Layered Structures", Applied Physics Letters, vol. 47, No. 2, Jul. 15, 1985, pp. 178–180.

M. Suzuki, et al., "Read–Write Characteristics of Co/Pt Multilayer Perpendicular Magnetic Recording Media", Journal of the Magnetics Society of Japan, vol. 18, Supplement No. S1, 1994, pp. 451–454.

L. Wu, et al., "Noise Origin in Co/Pd Multilayer Media for Perpendicular Magnetic Recording", IEEE Transactions on Magnetics, vol. 33, No. 5, Sep. 1997, pp. 3094–3096.

N. Honda, et al., "Time Dependence of Magnetic Properties in Perpendicular Recording Media", IEICE Trans. Electron, vol. E80–C, No. 9, Sep. 1997, pp. 1180–1186.

Y. Hirayama, Magnetization Decay in CoCr–alloy Perpendicular Magnetic Recording Media, Journal of the Magnetics Society of Japan, vol. 21, Supplement No. S2, 1997, pp. 297–300.

* cited by examiner

Primary Examiner—Paul Thibodeau
Assistant Examiner—Kevin M. Bernatz
(74) Attorney, Agent, or Firm—Thomas R. Berthold

(57) ABSTRACT

A composite perpendicular magnetic recording disk has two distinct magnetic layers formed on the disk substrate, each with strong perpendicular magnetic anisotropy, that are strongly exchange coupled perpendicularly to each other across their interface. The first layer is a CoCr granular layer formed on a growth-enhancing sublayer, such as titanium, so as to have strong perpendicular magnetic anisotropy. The second layer is a continuous layer, preferably a continuous multilayer of Co/Pt or Co/Pd palladium formed on top of the granular layer. An interface layer, such as a layer of platinum or palladium, depending on whether the top multilayer is Co/Pt or Co/Pd, respectively, may be located between the two layers to enhance the growth of the continuous multilayer.

19 Claims, 4 Drawing Sheets

MAGNETIC RECORDING DISK WITH COMPOSITE PERPENDICULAR RECORDING LAYER

TECHNICAL FIELD

This invention relates to magnetic recording disks for use in perpendicular magnetic recording systems, such as rigid disk drives.

BACKGROUND OF THE INVENTION

Perpendicular magnetic recording, wherein the recorded bits are stored in a perpendicular orientation in the media, is considered to be a promising path toward ultra-high recording densities in magnetic recording rigid disk drives. While perpendicular magnetic recording rigid disk drives have not yet been commercially realized, several types of perpendicular magnetic recording media have been proposed.

The most widely reported type of perpendicular media is a cobalt-chromium (CoCr) alloy "granular" layer grown on a special growth-enhancing sublayer that induces the crystalline C-axis to be perpendicular to the plane of the layer, so that the layer has strong perpendicular magnetic anisotropy. This type of media is called "granular" because the individual grains are only weakly exchange coupled laterally.

To improve the signal-to-noise ratio (SNR) and the resolution in perpendicular magnetic recording media, including the CoCr granular type of media, the thickness of the medium is decreased. However, a thin perpendicular medium has a large demagnetizing field at the top surface. Thus while the CoCr granular type of perpendicular media may have good SNR, it is vulnerable to demagnetization and thermal decay at low spatial frequencies, because strong demagnetizing fields exists at the center of large bit cells. The centers of such bit cells have been reported to undergo severe demagnetization and thermal instability in CoCr granular perpendicular media, as reported by Hirayama et al., "Magnetization Decay in CoCr-alloy Perpendicular Magnetic Recording Media", *Journal of the Magnetics Society of Japan*, Vol. 21, Supplement, No. S2, pp. 297–300 (1997).

Another type of perpendicular media is a "continuous" multilayer or superlattice of alternating films of Co with films of platinum (Pt) or palladium (Pd), which have been shown to have strong perpendicular magnetic anisotropy. Carcia et al., "Perpendicular Magnetic Anisotropy in Pd/Co Thin Film Layered Structures", *Appl. Phys. Lett.*, Vol. 47, pp. 178–180 (1985). They are called "continuous" because the grains in the films are strongly exchange-coupled laterally. These multilayers and have been shown to possess very high thermal stability, even at large bit separation, as reported by Honda et al., "Time Dependence of Magnetic Properties in Perpendicular Recording Media", *IEICE TRANS. ELECTRON.*, Vol. E80-C, No. 9, pp. 1180–1185, September 1997. However, the medium noise for this type of continuous exchange-coupled media is considerably higher than for the CoCr granular media, resulting in low SNR values. Suzuki et al., "Read-Write Characteristics of Co/Pt Multilayer Perpendicular Magnetic Recording Media", *Journal of the Magnetics Society of Japan*, Vol. 18, Supplement, No. S1, pp. 451–454 (1994). The large medium noise is due to the strong lateral exchange-coupling between the Co grains in the multilayer, which results in large magnetic domain sizes. Wu et al., "Noise Origin in Co/Pd multilayer Media for Perpendicular Magnetic Recording", *IEEE TRANSACTIONS ON MAGNETICS*, Vol. 33, No. 5, pp. 3094–3096, September 1997.

What is needed is a perpendicular magnetic recording medium that has high SNR and good thermal stability.

SUMMARY OF THE INVENTION

The invention is a composite perpendicular magnetic recording disk that has two distinct magnetic layers formed on the disk substrate, each with strong perpendicular magnetic anisotropy, that are strongly exchange coupled perpendicularly to each other across their interface. In the preferred embodiment the first layer is a CoCr granular layer formed on a growth-enhancing sublayer, such as titanium, so as to have strong perpendicular magnetic anisotropy. The second layer is a continuous layer, preferably a continuous multilayer of Co/Pt or Co/Pd formed on top of the granular layer. An interface layer, such as a layer of platinum or palladium, depending on whether the top multilayer is Co/Pt or Co/Pd, respectively, may be located between the two layers to enhance the growth of the continuous multilayer and to moderate the strength of the exchange coupling between the granular layer and the continuous multilayer. If the composite perpendicular magnetic recording disk is to be used in a rigid disk drive that uses a pole type read/write head, a soft magnetically permeable underlayer is located on the disk substrate beneath the granular layer. If the composite disk is to be used in a disk drive that uses a ring type head, where a soft underlayer may not be necessary, then the continuous multilayer may be the bottom layer located on the substrate and the granular layer may be the top layer located on the continuous multilayer. In both cases, there is strong perpendicular exchange coupling at the interface between the granular layer and the continuous layer. As an alternative to the Co/Pt or Co/Pd multilayer as the continuous layer, the continuous layer may be a single layer of chemically ordered CoPt, CoPd, FePt, FePd, CoPt$_3$ or CoPd$_3$. The composite medium has a higher SNR at high linear recording densities than either a CoCr granular layer alone or a Co/Pt continuous multilayer alone. as well as thermal stability approaching that of a Co/Pt continuous multilayer.

For a fuller understanding of the nature and advantages of the present invention, reference should be made to the following detailed description taken together with the accompanying figures.

DETAILED DESCRIPTION

Preferred Embodiments

Figure 1:
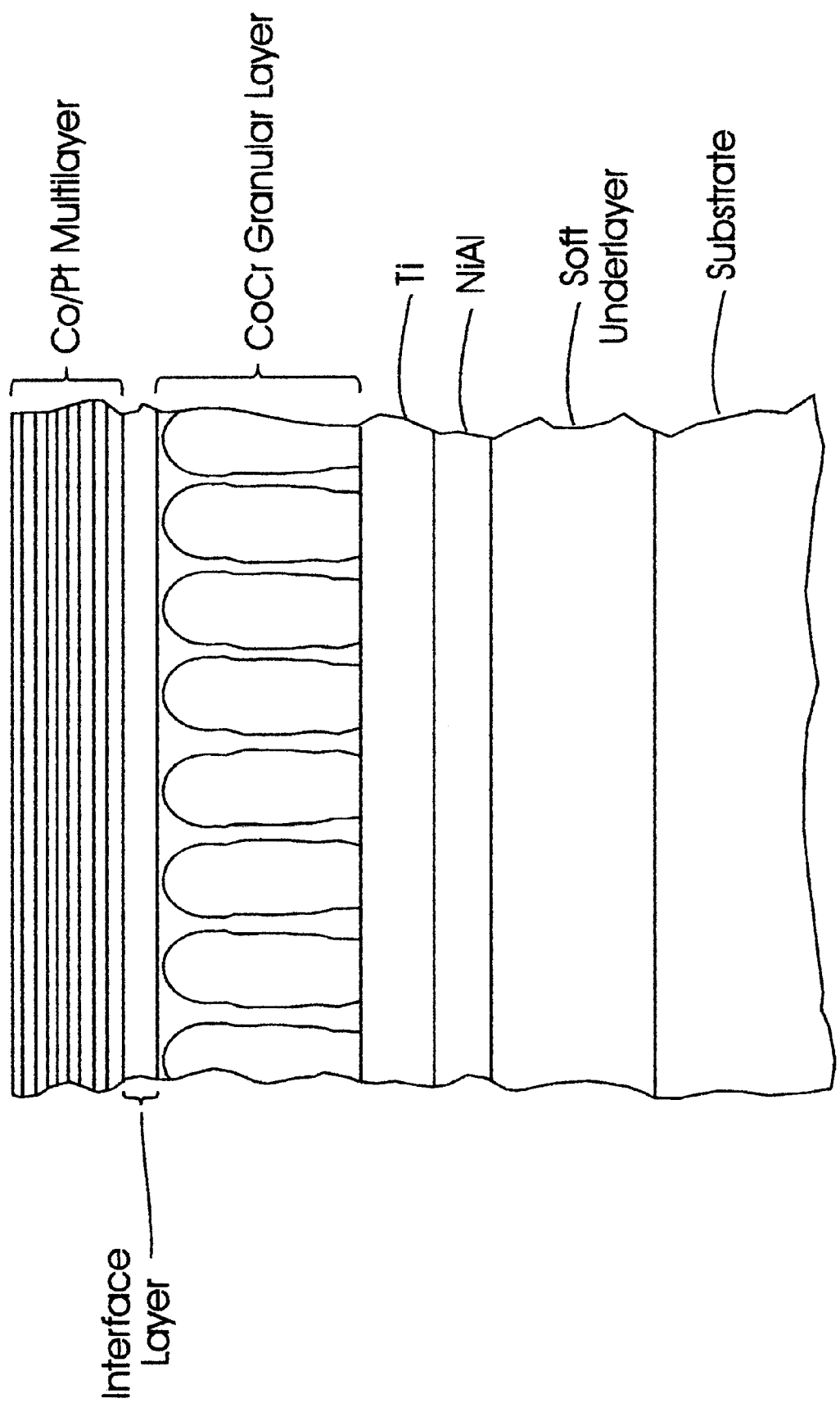
FIG. 1 is a schematic sectional view of the composite perpendicular magnetic recording disk according to the present invention.

FIG. 1 shows a schematic of the composite medium of the present invention. This composite medium is a "granular"

host layer of CoCr with perpendicular magnetic anisotropy and a "continuous" exchange coupled multilayer with perpendicular anisotropy grown on top of the granular host layer. An optional interface layer may be located between the host layer and the continuous layer.

The CoCr host layer is referred to as a "granular" layer because the grains are weakly exchange coupled laterally. This leads to low magnetic transition noise. An additional element or elements is often added to the CoCr host layer to provide chemical segregation between the individual grains and thus enhance the exchange decoupling.

The top structure of the composite medium is referred to as a "continuous" exchange coupled layer because there is a dense packing of the magnetic grains such that lateral exchange forces are readily transmitted between the grains. In the preferred embodiment this structure is a well-known superlattice or multilayer of alternating first and second films, i.e., Co/Pt or Co/Pd, having perpendicular magnetic anisotropy.

In the composite medium of the present invention there is a strong perpendicular exchange coupling between the granular layer and the continuous layer at the interface between the granular layer and the continuous layer.

The composite perpendicular medium depicted in FIG. 1 was prepared with a 50 nm $Co_{72}Cr_{28}$ bottom granular layer, a 2 nm Pt interface layer directly on the granular layer, and a 14 nm Co/Pt multilayer formed of 10 bilayers of 0.4 nm Co and 1.0 nm of Pt as the top continuous layer directly on the interface layer. All of the films making up the composite medium were deposited by conventional sputter deposition. The rigid substrate is a conventional glass disk. A nickel-aluminum alloy (NiAl) layer is deposited on the substrate and a titanium (Ti) film is deposited on the NiAl layer. The Ti film is an sublayer for the CoCr granular host layer that encourages the perpendicular crystalline anisotropy of the CoCr granular layer. Other materials that may be used as the growth-enhancing sublayer for the CoCr granular layer include TiCr, C, NiAl, $SiO_2$ and $CoCr_{(35-40)}$. In perpendicular magnetic recording systems that use pole heads for reading and writing, a "soft" magnetically permeable underlayer is often used on the substrate beneath the Ti sublayer to provide a flux return path for the field from the read/write pole head. In perpendicular magnetic recording systems that use ring heads for reading and writing, a soft underlayer may not be necessary. Alloy materials that are suitable for the soft underlayer include NiFe, FeAlSi, FeTaN, FeN, CoFeB and CoZrNb.

The magnetic properties of this composite medium were measured using a vibrating sample magnetometer (VSM), a polar Kerr instrument, and a SQUID magnetometer. The measured coercivity (Hc) values for this medium were 2.44 kOe (Kerr) and 2.3 kOe (VSM).

Figure 2:
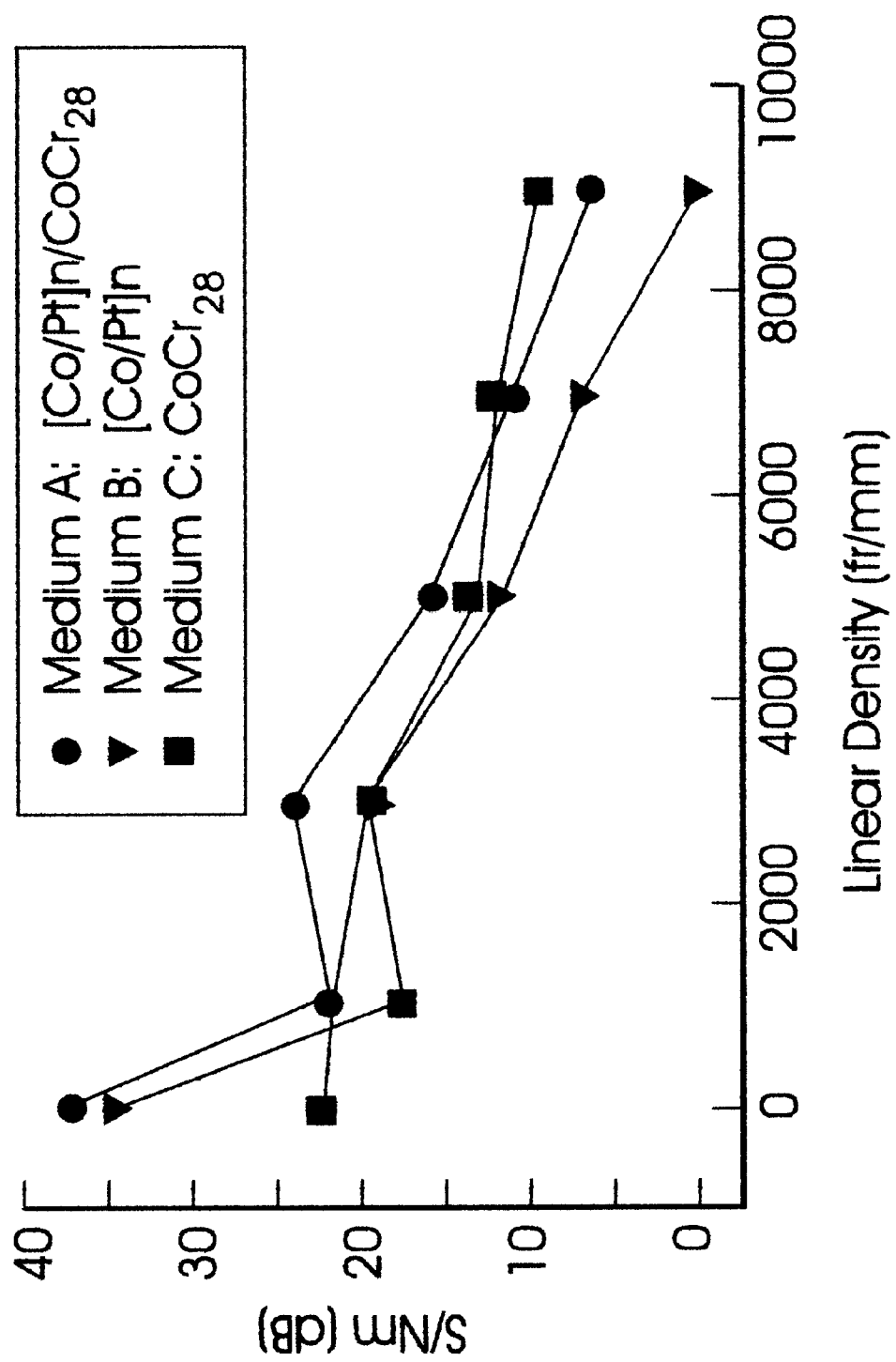
FIG. 2 is a graph comparing the SNR as a function of linear bit density for the composite medium of the present invention with a CoCr granular medium and a continuous Co/Pt multilayer medium.
Figure 3:
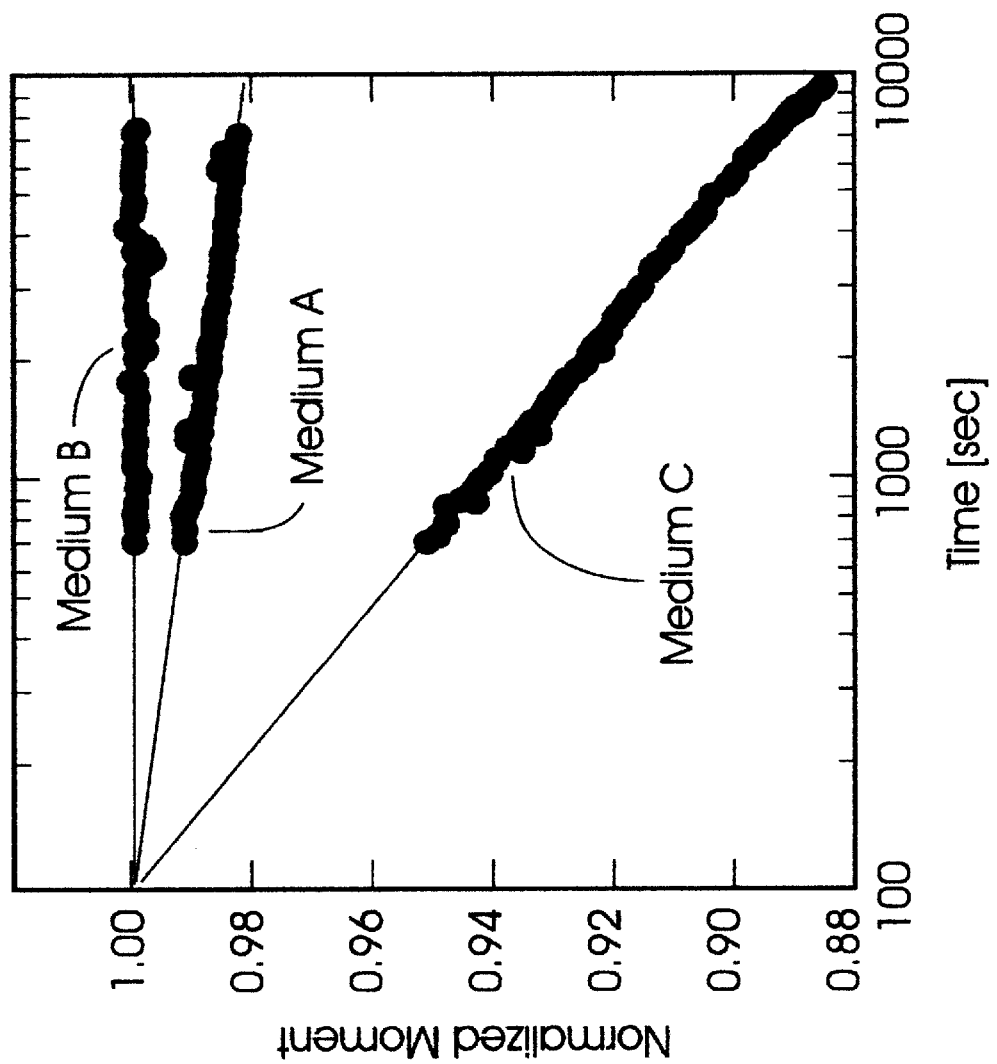
FIG. 3 is a graph comparing the thermal stability (as determined by magnetic moment decay) for the composite medium of the present invention with a CoCr granular medium and a continuous Co/Pt multilayer medium
Figure 4:
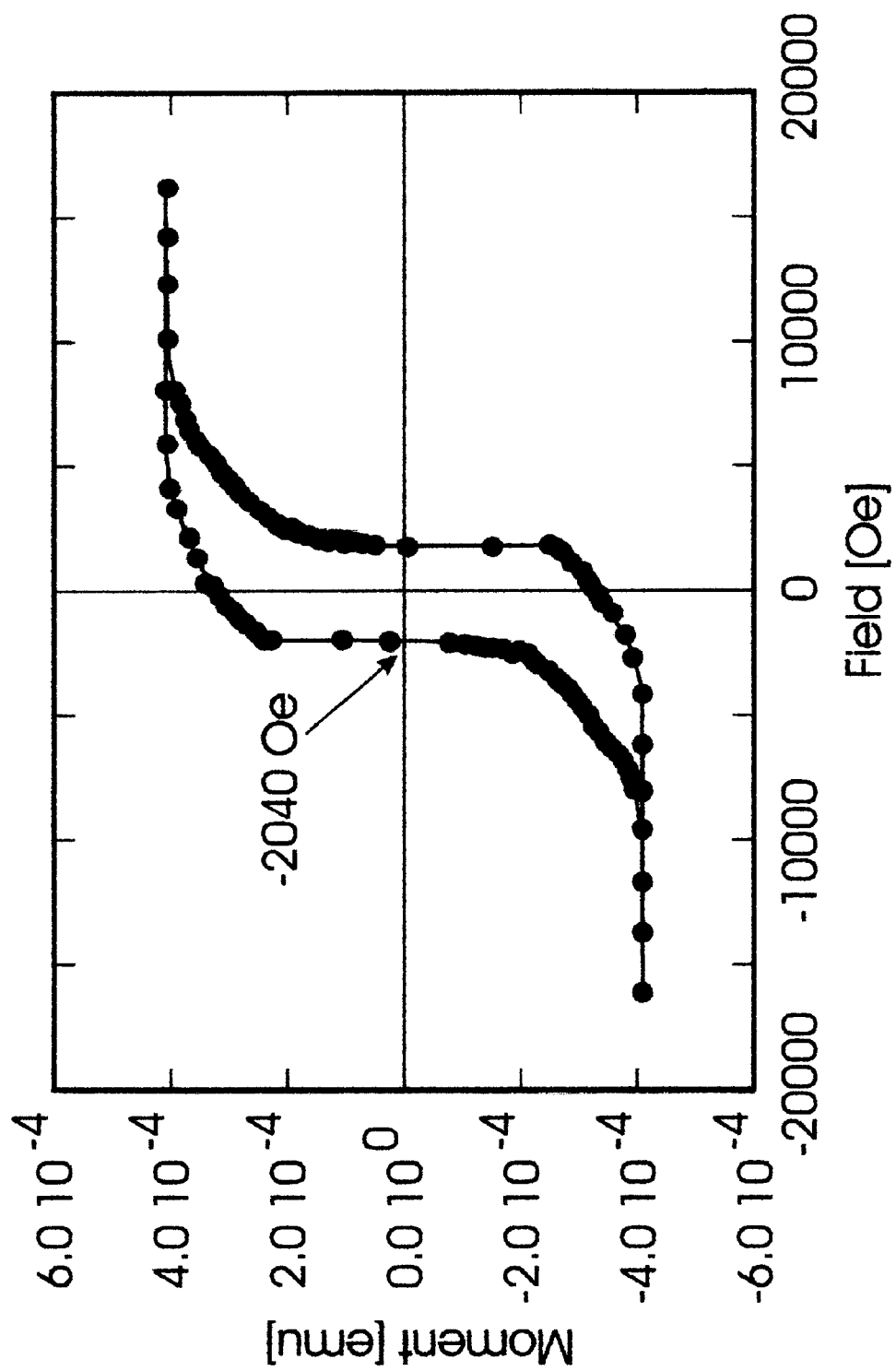
FIG. 4 is a M-H loop for the composite medium of the present invention.

To confirm the effect of the granular perpendicular magnetic layer and the continuous exchange coupled magnetic layer, the SNR and thermal stability of the composite medium were measured by a magnetoresistive read head and by a SQUID magnetometer, respectively. The results are shown in FIGS. 2 and 3, respectively. The measured data for the composite medium (A), a Co/Pt multilayer medium (B), and a $Co_{72}Cr_{28}$ granular medium (C) were used for comparison. Medium A is the composite medium of the present invention with a top [Co (0.4 nm)/Pt (1.0 nm)]10 multilayer, a 2 nm Pt interface layer, and a bottom 50 nm $Co_{72}Cr_{28}$ granular layer fabricated directly on a glass disk substrate. Medium B is a multilayer medium with a [0.4 nm Co/1 nm Pt]16 multilayer formed on a 2 nm Pt seed layer with a 10 nm Pt protective chemical passivation film over the multilayer. Medium C is a conventional granular $Co_{72}Cr_{28}$ medium with a thickness of 50 nm. Measured Kerr Hc values for A, B, and C were 1420 Oe, 1029 Oe, and 2170 Oe, respectively. Also, the M-H loop for the composite medium according to the present invention (medium A) is shown in FIG. 4.

The SNR for the composite medium A was compared with the SNR for medium B and medium C, as shown in FIG. 2. The SNR for medium A in the linear density range of approximately of 10–7000 thousand flux reversals/mm (fr/mm) was larger than that for medium B and medium C. The effect of the granular perpendicular layer on the composite medium A can be understood by comparing the SNR results for medium A and B. The granular magnetic layer contributes strongly to the SNR. Furthermore, the thermal stability, as measured by the remanent moment decay, for the composite medium A was compared with those for B and C, as shown in the SQUID data of FIG. 3. The condition of DC magnetization was used for the remanent moment decay. This condition is the most severe for perpendicular media due to a large demagnetization field. The composite medium A showed smaller decay than the $Co_{72}Cr_{28}$ granular medium C. Thus, the continuous exchange coupled top layer contributes strongly to the thermal stability of the composite medium.

By taking advantage of both the strong perpendicular surface anisotropy of the continuous exchange coupled multilayer and the well-segregated grains of the granular magnetic layer, the composite medium exhibits improved SNR and thermal stability.

In the composite medium according to the present invention, the multilayer on top is grown with strong perpendicular surface anisotropy and is exchange coupled to the host grain essentially in the perpendicular direction. Lateral exchange coupling in the horizontal direction between the host grains is suppressed by suitable phase segregation mechanisms. These segregation boundaries of the grains do not significantly exchange couple to the multilayer on top of the host layer. The combined effect of strong surface anisotropy of the top multilayer and the strong perpendicular exchange coupling between the grains of the bottom host layer and the top multilayer renders the magnetization near the top surface of the host layer more uniform and therefore less susceptible to thermal decay and demagnetization effects.

When the composite medium is written with a suitable recording head, the relatively larger grains of the host layer experience a strong switching torque and reverse to form a sharp transition in the presence of the head field. The magnetic and exchange fields emanating from the host grains effectively pin the domain walls of the exchange coupled multilayer on top of the granular host layer. Therefore, this pinning wall is sharp and well defined, which results in the reduction of medium noise.

In the writing process the exchange coupled multilayer and the granular host layer serve important distinct functions: 1) the top exchange coupled multilayer stabilizes the magnetization of the host grains and prevents reverse magnetic domains that would occur because of large demagnetization fields and imperfections in the granular magnetic host layer; and 2) the granular host layer with well segregated exchange decoupled grains pins and defines the domain structure of the top exchange coupled multilayer.

Modifications and Alternatives to the Preferred Embodiments

Additional elements can be added to the CoCr alloy granular layer. These include Pt in an amount up to approximately 30 atomic percent (at %), B up to approximately 25 at %, Ta up to approximately 10 at %, and Nb up to approximately. 10 at %. The Cr content in the CoCr portion of the alloy is preferably in the range of approximately 10–30 at %.

The continuous layer of a Co/Pt multilayer may be replaced with a Co/Pd multilayer. The Co/Pt or Co/Pt multilayer structure may optionally be formed on a Pt or Pd, respectively, interface layer up to about 2.5 nm thick located on top of the CoCr granular host layer. The combination of cobalt and platinum provides a strong perpendicular anisotropy because the symmetry of the cobalt lattice is broken at the interface with the platinum. By beginning the deposition of the multilayer with a platinum, or by providing a separate Pt or Pd interface layer, the coercivity of the resulting composite medium has been shown to be increased.

The Co films in the Co/Pt and Co/Pd superlattice of the continuous layer can also be higher order alloys (e.g., binary, ternary or quarternary alloys of one or more of Cr, Ta, Pt and B).

The continuous layer of the composite medium can also be a single layer of chemically ordered CoPt, CoPd, FePt, FePd, $CoPt_3$ or $CoPd_3$. Chemically-ordered alloys of CoPt, CoPd, FePt or FePd, in their bulk form, are known as face-centered tetragonal (FCT) $L1_0$-ordered phase materials (also called CuAu materials). They are known for their high magnetocrystalline anisotropy and magnetic moment. The c-axis of the $L1_0$ phase is the easy axis of magnetization and is oriented perpendicular to the substrate, thus making the material suitable for perpendicular magnetic recording media. These are also "continuous" layers because there is strong lateral exchange coupling forces between the grains. Also, like the Co/Pt and Co/Pd multilayers, these layers have very strong perpendicular anisotropy.

The present invention has been described with the granular layer as the bottom or host layer, and the continuous layer as the top layer. However, if the composite medium is to be used in a perpendicular magnetic recording system that does not require a medium with a soft magnetic underlayer, the continuous layer can be the bottom or host layer, and the granular layer the top layer. In such a medium there is still strong perpendicular exchange coupling between the two layers at the interface. In addition, in such a structure a second continuous layer can be formed on top of the granular layer, so that the resulting structure would be the substrate, a first continuous layer, a granular layer, and a second continuous layer.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording disk comprising:
   a substrate having a substantially planar first surface;
   a granular layer of an alloy comprising cobalt and chromium on said first surface, the granular layer having perpendicular magnetic anisotropy; and
   a continuous layer of material on said first surface in contact with the granular layer at an interface and having perpendicular magnetic anisotropy, the material of the continuous layer being exchange coupled perpendicularly with the granular layer at the interface between the granular layer and the continuous layer, the continuous layer comprising a multilayer of alternating first and second films, the first film consisting essentially of cobalt and the second film being selected from the group consisting of platinum and palladium.

2. The disk according to claim 1 wherein the granular layer alloy further comprises platinum in an amount up to approximately 10 atomic %.

3. The disk according to claim 1 wherein the granular layer alloy further comprises boron in an amount up to approximately 25 atomic %.

4. The disk according to claim 1 wherein the granular layer alloy further comprises tantalum in an amount up to approximately 10 atomic %.

5. The disk according to claim 1 wherein the granular layer alloy further comprises niobium in an amount up to approximately 10 atomic %.

6. The disk according to claim 1 wherein the first film is a cobalt alloy comprising cobalt and one or more of elements selected from the group consisting of tantalum, platinum, chromium and boron.

7. The disk according to claim 1 wherein the granular layer is located between the substrate and the multilayer and further comprising an interface layer of material identical to the material of the second film, the interface layer being formed directly on the granular layer and the multilayer being formed directly on the interface layer.

8. The disk according to claim 1 wherein the granular layer is located between the substrate and the multilayer and the multilayer is located on top of the granular layer.

9. The disk according to claim 8 further comprising a growth enhancing sublayer of material selected from the group consisting of Ti, TiCr, C, NiAl, $SiO_2$ and CoCr (wherein Cr is between 35 and 40 atomic percent) located between the substrate and the granular layer, and wherein the granular layer is formed directly on the growth enhancing sublayer.

10. The disk according to claim 8 further comprising a soft magnetically permeable underlayer located between the substrate and the granular layer.

11. The disk according to claim 10 wherein the soft magnetically permeable underlayer is selected from the group consisting of NiFe, FeAlSi, FeTaN, FeN, CoFeB and CoZrNb.

12. A perpendicular magnetic recording disk comprising:
   a substrate;
   a soft magnetically permeable underlayer on the substrate;
   a growth enhancing sublayer of material selected from the group consisting of Ti, TiCr, C, NiAl, $SiO_2$ and CoCr (wherein Cr is between 35 and 40 atomic percent) on the soft underlayer;
   a granular layer of an alloy comprising cobalt and chromium, the granular layer having perpendicular magnetic anisotropy and being formed directly on the growth enhancing sublayer; and
   a multilayer having perpendicular magnetic anisotropy formed on the granular layer and comprising alternating first and second films, the first film consisting essentially of cobalt and the second film being selected from the group consisting of platinum and palladium, the multilayer being exchange coupled perpendicularly with the granular layer at the interface between the granular layer and the multilayer.

13. The disk according to claim 12 wherein the soft magnetically permeable underlayer is selected from the group consisting of NiFe, FeAlSi, FeTaN, FeN, CoFeB and CoZrNb.

14. The disk according to claim 12 wherein the granular layer alloy further comprises platinum in an amount up to approximately 10 atomic %.

15. The disk according to claim 12 wherein the granular layer alloy further comprises boron in an amount up to approximately 25 atomic %.

16. The disk according to claim 12 wherein the granular layer alloy further comprises tantalum in an amount up to approximately 10 atomic %.

17. The disk according to claim 12 wherein the granular layer alloy further comprises niobium in an amount up to approximately 10 atomic %.

18. The disk according to claim 12 wherein the first film of the multilayer is a cobalt alloy comprising cobalt and one or more of elements selected from the group consisting of tantalum, platinum, chromium and boron.

19. The disk according to claim 12 further comprising an interface layer directly on the granular layer and wherein the multilayer is directly on the interface layer, the interface layer being formed of a material identical to the material of the second film of the multilayer.

* * * * *